(12) United States Patent
La Gamba et al.

(10) Patent No.: US 10,384,864 B2
(45) Date of Patent: Aug. 20, 2019

(54) CARTRIDGE FOR SOLUBLE PRODUCTS WITH SEALING MEMBER

(71) Applicant: GOGLIO S.P.A., Milan (IT)

(72) Inventors: Luca La Gamba, Daverio (IT); Roberto Galbasini, Casale Litta (IT)

(73) Assignee: GOGLIO S.P.A., Daverio (Varese) (IT)

(*) Notice: Subject to any disclaimer, the term of this patent is extended or adjusted under 35 U.S.C. 154(b) by 352 days.

(21) Appl. No.: 14/898,391

(22) PCT Filed: May 12, 2014

(86) PCT No.: PCT/EP2014/059673
§ 371 (c)(1),
(2) Date: Dec. 14, 2015

(87) PCT Pub. No.: WO2014/198474
PCT Pub. Date: Dec. 18, 2014

(65) Prior Publication Data
US 2016/0207697 A1     Jul. 21, 2016

(30) Foreign Application Priority Data

Jun. 13, 2013  (IT) .............................. MI2013A0975

(51) Int. Cl.
*B65D 85/804*      (2006.01)
*A47J 31/06*       (2006.01)
(Continued)

(52) U.S. Cl.
CPC .......... *B65D 85/8043* (2013.01); *A47J 31/00* (2013.01); *A47J 31/0684* (2013.01);
(Continued)

(58) Field of Classification Search
CPC .... A47J 31/00; A47J 31/0684; A47J 31/3623; A47J 31/407; B60K 17/28; B65D 85/8043
(Continued)

(56) References Cited

U.S. PATENT DOCUMENTS 5,265,517 A * 11/1993 Gilbert ..................... A23F 5/26
                                                        99/280
9,776,788 B2 * 10/2017 Gerbaulet .......... B65D 85/8043
(Continued)

FOREIGN PATENT DOCUMENTS

WO      2010/084475 A2      7/2010
WO      2012/070000 A1      9/2012
(Continued)

OTHER PUBLICATIONS

International Search Report, dated Sep. 8, 2014, from corresponding PCT application.

*Primary Examiner* — Ibrahime A Abraham
*Assistant Examiner* — Frederick F Calvetti
(74) *Attorney, Agent, or Firm* — Young & Thompson

(57) ABSTRACT

Cartridge (1) for containing coffee or soluble products in general, suitable for being inserted in an apparatus for the production of beverages via pressurized water or other extraction fluid, the cartridge including a container body (10), hermetically closed at the opposite bases thereof (11, 12), respectively for the water input and for the beverage output from the cartridge, and an annular flange (20) at the edge of the base (12) for the beverage output and a sealing member (30) on the flange (20), wherein the sealing member consists of an annular seat (31) delimited on the base by a wall (32) of smaller thickness with respect to the remaining portion of the annular flange (20).

11 Claims, 3 Drawing Sheets

(51) Int. Cl.
*A47J 31/36* (2006.01)
*A47J 31/00* (2006.01)
*B60K 17/28* (2006.01)
*A47J 31/40* (2006.01)

(52) U.S. Cl.
CPC ......... *A47J 31/3623* (2013.01); *A47J 31/407* (2013.01); *B60K 17/28* (2013.01)

(58) Field of Classification Search
USPC .................................................... 99/323, 295
See application file for complete search history.

(56) References Cited

U.S. PATENT DOCUMENTS

| | | | | |
|---|---|---|---|---|
| 2006/0196364 | A1* | 9/2006 | Kirschner | A47J 31/3623 99/295 |
| 2007/0186784 | A1* | 8/2007 | Liverani | A47J 31/0668 99/295 |
| 2010/0173056 | A1* | 7/2010 | Yoakim | A47J 31/22 426/433 |
| 2011/0185910 | A1* | 8/2011 | Ryser | A47J 31/0684 99/295 |
| 2011/0297005 | A1* | 12/2011 | Mariller | A47J 31/0673 99/295 |
| 2012/0180670 | A1* | 7/2012 | Yoakim | A47J 31/3628 99/295 |
| 2013/0125762 | A1* | 5/2013 | Dogan | B65D 85/8043 99/295 |
| 2013/0224341 | A1* | 8/2013 | BenDavid | B65D 85/8043 426/112 |
| 2014/0272018 | A1* | 9/2014 | Koller | B65D 85/8043 426/115 |
| 2015/0191302 | A1* | 7/2015 | Gerbaulet | B65D 85/8043 426/112 |
| 2015/0208852 | A1* | 7/2015 | Doglioni Majer | B65D 85/8043 99/295 |
| 2016/0068334 | A1* | 3/2016 | Cafaro | B65D 85/8043 426/115 |

FOREIGN PATENT DOCUMENTS

| | | |
|---|---|---|
| WO | 2012/118367 A1 | 9/2012 |
| WO | 2013/053655 A1 | 4/2013 |
| WO | WO2013171238 * | 11/2013 |

* cited by examiner

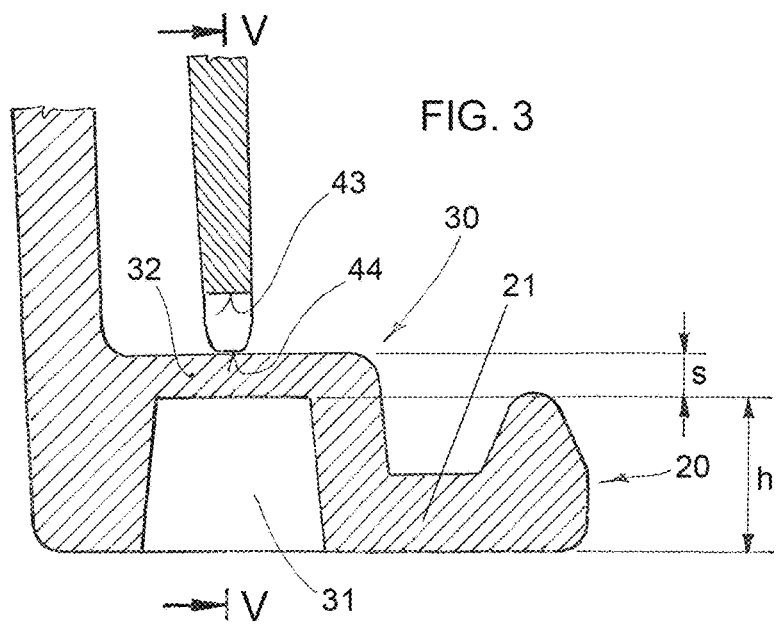
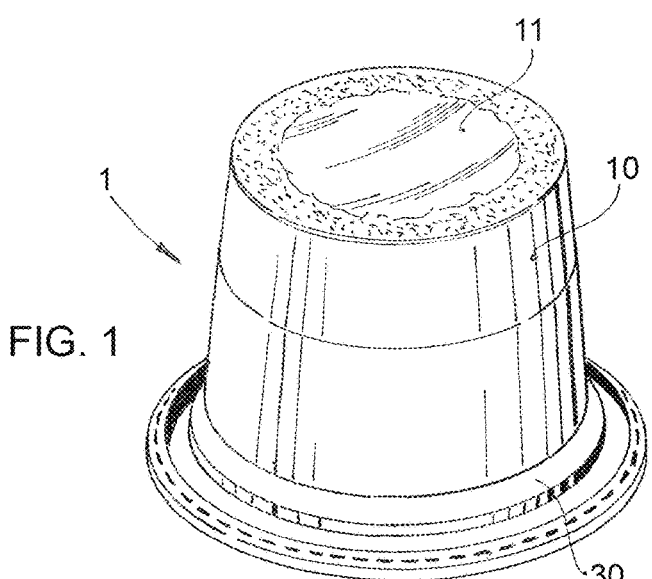
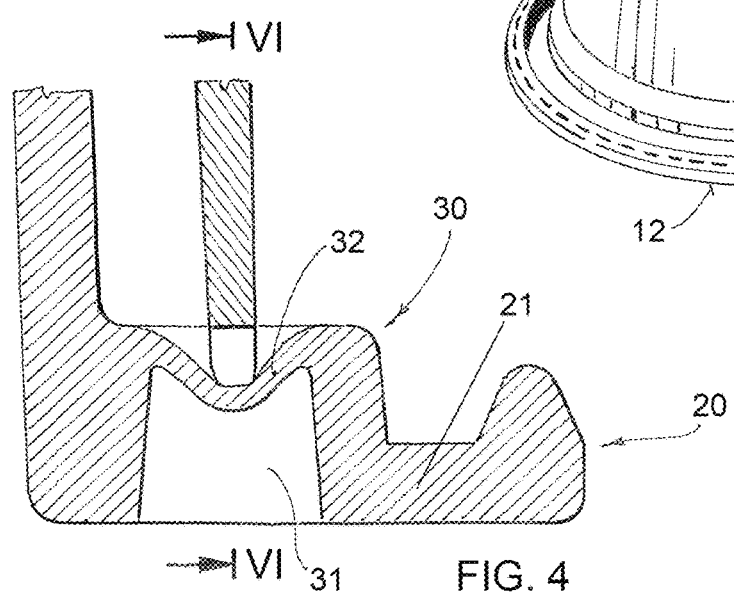

CARTRIDGE FOR SOLUBLE PRODUCTS WITH SEALING MEMBER

BACKGROUND OF THE INVENTION

Field of the Invention

The object of the present invention is a cartridge, capsule or pod for the containing of products which are extractable or soluble in pressurised hot water or another extraction fluid for the preparation of beverages, such as granular or powdery products such as coffee, barley, powder milk and the like, or leaf products such as tea, chamomile, infusions and the like. More particularly the invention relates to such a cartridge provided with a sealing member.

Description of the Related Art

Herein below specific reference will be made to a cartridge for containing coffee powder, without detriment to the fact that such a cartridge can be used for the containing of other soluble products for the preparation of beverages.

Such a cartridge is described for example in the patent application PCT/EP2012/069794 in the name of the same Applicant.

For the preparation of the beverage a cartridge filled with the soluble product in powder or granules is inserted in a special chamber of an apparatus for the extraction of beverages, in which pressurised hot water is injected which enters the cartridge from an input side, traverses the product contained therein, retaining the aromas in such a way as to generate the beverage, and exits from the output side of the cartridge.

There are different systems for causing the passage of the fluid through the cartridge which provide for example for the perforation with mechanical means of the side of input and/or of output of the cartridge, or the breakage of membranes placed on these sides following the increase in pressure of the fluid, as provided for example for the cartridge which is the object of the aforesaid application PECT/EP2012/069794. However the particular systems of extraction of the beverage do not form the object of the invention.

Such a cartridge normally has a cup, cylindrical or truncated cone shape, with a perimeter flange at the side of output of the beverage, suitable for being clamped between a bell-shaped member of the extraction chamber, suitable for holding the body of the cartridge, and a counter-plate.

The closure of the extraction chamber at said perimeter flange of the cartridge must be perfectly tight, to avoid releases of liquid outside of the cartridge, with consequent reduction in pressure inside the extraction chamber and therefore of the cartridge, which has repercussions on the quality of the beverage produced, in particular coffee.

However the presence of irregularities on the edge of the bell-shaped member due to wear during the life cycle of the extraction apparatus, or provided deliberately on this edge in order to facilitate extraction of the cartridge from the apparatus and/or in order to improve the distribution of force on the flange of the cartridge and reduce the force of closure required, can lead to leaks of fluid with the disadvantages illustrated previously.

WO 2010/084475 A2 refers to a cartridge for the containing of soluble products, in particular coffee, and describes various configurations of an end flange suitable for being interposed between the end edge of a body for housing of the cartridge and a contrast plate during the extraction of the beverage. The upper face of the flange forms tendentially an angle smaller than 90° with the side wall of the cartridge so as to facilitate the penetration of the end edge of the housing body in the end flange. In some embodiments the end flange has a variable thickness but always has a substantially plane surface (or in any case free from pitting) turned towards said contrast plate.

WO 2012/118367 A1 describes a capsule for use in an apparatus for preparing beverages, the capsule having an end flange suitable for being interposed between the edge of a body for containing the capsule and a counter-plate of said apparatus. Attached on the flange, by welding, gluing or other means of attachment, is a sealing member having at least one undulation such as to form a corresponding cavity closed with the end flange, which has a flat surface turned towards said counter-plate. The providing of a sealing member separate from the end flange makes the process of production of the capsule more complex and costly and influences the reliability of the same.

SUMMARY OF THE INVENTION

Consequently the object of the invention is that of eliminating the aforesaid disadvantages, providing a cartridge which guarantees the fluid tightness in the extraction chamber during the preparation of the drink, aside from possible accidental or deliberate irregularities provided on the edge of the bell-shaped member of the extraction chamber.

Another object of the present invention is that of providing such a cartridge with sealing member, which is highly reliable and simple and economical to manufacture.

The aforesaid objects are achieved by the cartridge with sealing member according to the invention, which has the features of the independent claim 1.

Advantageous embodiments of the invention form the object of the dependent claims. Substantially the cartridge according to the invention, designed to be inserted in an extraction apparatus for the preparation of beverages and having a cup, cylindrical or truncated cone shape, with a perimeter flange at the side of output of the beverage, is provided with a sealing member at this flange, constituted by an annular seat open in the direction of output of the beverage from the cartridge, delimited on the base by a wall of smaller thickness with respect to the rest of the flange, so as to deform during the mechanical action of closure of the extraction chamber, going to adhere perfectly to the aforesaid irregularities, ensuring a hermetic seal.

The aforesaid annular sealing seat is made in a single body with the cartridge, which can be in PP, coextruded PP/EVOH/PP, aluminium, PET, PBT, PLA or similar materials, and the aforesaid base wall has a thickness comprised between 0.1 and 0.8 mm.

The hydraulic seal is formed through the effect of the elasticity and of the possibility, by the aforesaid base wall of the sealing member, of deforming plastically, going to cover and fill every irregularity of the contact surface, such as grooves, undulations, with surface cavities or imperfections of various type.

The sealing capacity is influenced by the force of compression exerted on the sealing seat which acts as a rigid gasket: the greater the force exerted, the greater the deformation induced will be, and the greater the capacity of the material of the sealing seat will be to fill the irregularities of the contact surface.

With the same compression force, greater sealing can be produced, at the design stage, by reducing the thickness of the base wall of the sealing seat, which translates into an increase in flexibility and possibility of deforming plastically, by the wall itself.

It should be noted that the temperature also plays a fundamental role in the flexibility and in the deformability of the sealing seat. In fact the portion of hot fluid (water) which, due to the configuration of the extraction chamber, does not enter the cartridge but laps the external surface, increases the phenomena of plasticity of the wall of the sealing seat, improving the efficiency.

BRIEF DESCRIPTION OF THE DRAWING FIGURES

Further features of the invention will be made clearer by the following detailed description, referred to a purely non-limiting exemplary embodiment thereof, illustrated in the accompanying drawings in which:

FIG. 1 is a schematic perspective side view of a cartridge according to the invention;

FIG. 3 is an enlargement of the detail denoted by A in FIG. 2;

FIG. 4 is a fictitious view of the detail of FIG. 3 with the extraction chamber in condition of complete closure;

DETAILED DESCRIPTION OF THE INVENTION

Figure 2:
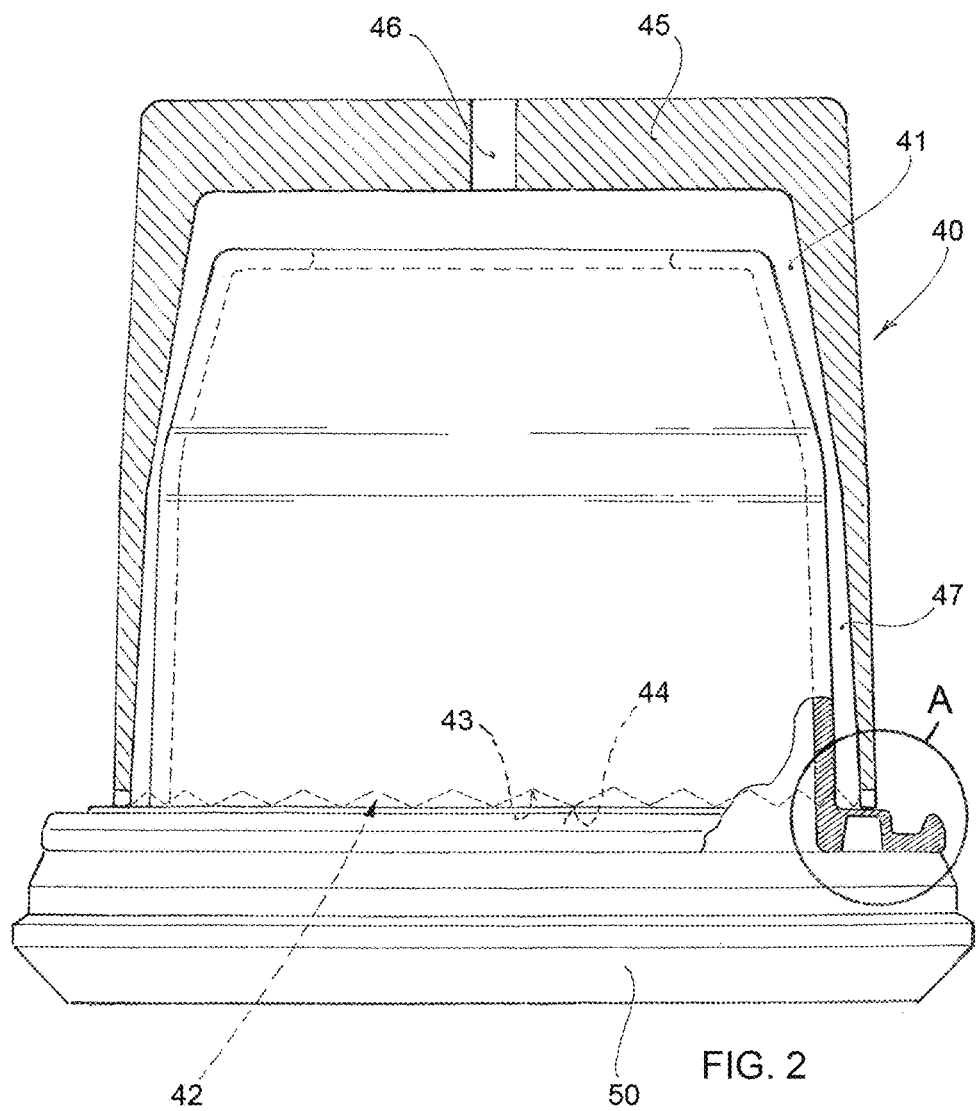
FIG. 2 is a schematic side elevation view, with cutaway and sectioned parts, of the cartridge of FIG. 1 inserted in the extraction chamber of an apparatus for the production of beverages, before the complete closure of this chamber.

Referring to the accompanying drawings, and for the time being in particular to FIG. 1, the cartridge or capsule for containing coffee or soluble products in general according to the invention has been denoted overall by reference numeral 1. It comprises a container body 10 with a cup shape, in this particular case truncated cone, with a smaller base 11 placed above in the illustration of FIG. 1, and a larger base 12 placed below.

The aforesaid bases 11, 12 are suitable for being traversed by the fluid during the preparation of the beverage and can be perforated by mechanical means or by the pressure of the working fluid.

According to the embodiment of the aforementioned patent application PCT/EP2012/069794, the bases 11 and 12 are constituted, at least in part, by seal closure membranes of the container body 10.

When the cartridge 1 is inserted in an apparatus for extraction of the beverage, as shown schematically in FIG. 2, the smaller base 11 constitutes the side of input of the water and the larger base 12 the side of output of the beverage.

Naturally, without departing from the scope of the invention, the side of input of the water and the side of output of the beverage can be inverted with respect to those indicated, as it is also clear that the extraction apparatus can be with vertical axis as shown in FIG. 2 or with horizontal axis.

As can be seen in FIG. 1, the cartridge likewise represents an external annular perimeter flange 20 at the side of output of the beverage, conveniently formed integrally at the container body 10.

At the peripheral flange 20 a sealing member 30 is also provided, which will be described in greater detail here below. The sealing member 30 is formed integrally at the peripheral flange 20, as illustrated in the accompanying drawings.

According to the invention the sealing member 30 is constituted by an annular seat 31 open in the direction of output of the beverage from the cartridge and having a base wall 32 of slim thickness, smaller than that of the remaining part of the flange 20.

More particularly the annular seat 31 is placed adjacent to the container body 10 and is shaped in such a way that said base wall thereof 32 is situated at a higher, i.e. more internal, level, with respect to the end section 21 of the flange 20.

Conveniently the thickness of this base wall 32 varies between 0.1 and 0.8 mm and is such as to confer a certain elasticity and plastic deformability to the wall 32 under the mechanical action of a shaped contrast punch, as will be described here below.

The thin wall 32, formed integrally at the perimeter flange 20 and at the container body 10, can be obtained through moulding of PP, PET, PBT, PLA or other, or through thermoforming of coextruded PP/EVOH/PP or other coextruded structures.

FIG. 2 shows schematically the cartridge 1 inserted in an apparatus for extraction of the beverage, whereof the essential elements are shown schematically, in particular a bell-shaped member, or contrast punch 40 and a counter-plate 50.

The bell-shaped member 40 has an internal chamber 41 wherein the container body 10 of the cartridge 1 is housed, while the perimeter flange 20, and in particular the sealing member 30, abuts against the free edge 42 of the member 40.

This edge 42 in FIG. 2 has been shown undulated along its entire development, such as to have an alternation of troughs 43 and reliefs 44. However these troughs 43 and reliefs 44 can involve only a part of the perimeter of the edge 42 of the bell-shaped member 40 and constitute deliberate or undesirable irregularities.

The upper or back wall 45 of the bell-shaped member 40 has a central hole 46 for the feeding of pressurised fluid in the extraction chamber 41 for the production of the beverage, after this fluid (water) has traversed the product contained in the cartridge 1.

The process of formation of the beverage will not be described further in that it is to be considered in itself known.

During the production of the beverage the pressurised water which enters the extraction chamber 41 flows also into the gap 47 (deliberately exaggerated in the accompanying drawings) which is created between the external wall of the container body 10 of the cartridge and the internal wall of the bell-shaped member 40 and could cause leaks outwards, with the disadvantages set out previously, should a sealed closure not be performed on the flange 20.

The sealing member 30, according to the invention, provided on the perimeter flange 20 of the cartridge, has in fact the purpose of avoiding leaks of fluid outwards during the process of extraction of the beverage, as can be seen more clearly from the enlargements of FIGS. 3 to 6.

Figure 5:
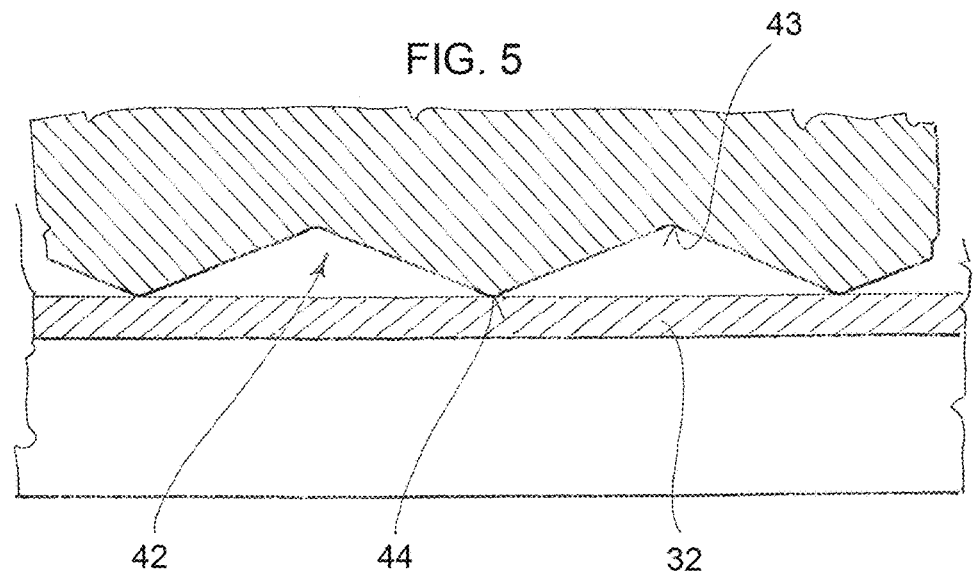
FIGS. 5 and 6 are schematic sections taken along the planes V-V and VI-VI of FIGS. 3 and 4 respectively.

FIGS. 3 and 5 show in two sections orthogonal one to the other the edge 42 of the bell-shaped member 40 resting on the sealing member 30 of the cartridge 1, before the complete approaching of the member 40 to the counter-plate 50. In this situation the pressurised fluid would tend to exit from the radial channels which would be created between the base wall 32 of the sealing seat 31 and the edge 42 of the member 40.

Figure 6:
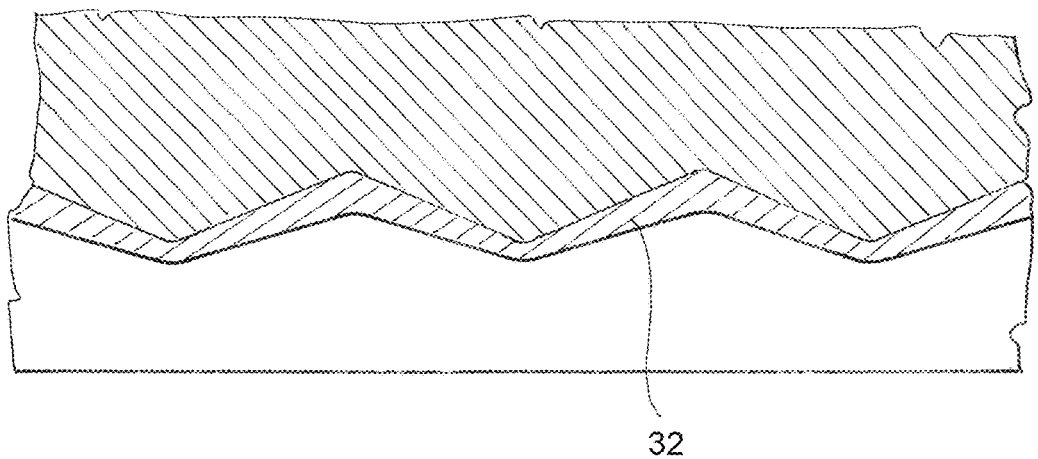

However, as can be seen in FIGS. 4 and 6, when the bell-shaped member 40 is pushed under pressure against the counter-plate 50, the elastic yielding of the base wall 32 of the sealing seat 31 means that the latter deforms and goes to cover and fill the troughs 43 or any other irregularity of the lower edge 42 of the bell-shaped member 40 performing a perfect sealed closure.

As mentioned, the deformation of said wall 32 which allows perfect sealing to be obtained is obtained thanks to its reduced thickness and to the presence of the hot fluid which laps the outer surface of the capsule.

In the example shown, the thickness s of the base wall 32 of the sealing member 30 is 0.2 mm, while the height h of the sealing seat 31 is 1.55 mm.

Naturally the invention is not limited to the particular embodiment previously described and illustrated in the accompanying drawings, but numerous detailed changes may be made thereto, within the reach of the person skilled in the art, without thereby departing from the scope of the invention itself as defined in the appended claims.

The invention claimed is:

1. A cartridge configured for containing coffee or soluble products, for insertion in an apparatus for production of beverages via pressurized water or other extraction fluid, the cartridge comprising:
   a container body, hermetically closed at opposite bases thereof, respectively for water input and for beverage output from the cartridge;
   an annular flange at an edge of one of said bases for the beverage output; and
   a seal on said annular flange,
   wherein said seal is formed integrally with said annular flange and comprises an annular seat open in a direction of output of the beverage from the cartridge and delimited on the one of said bases by a base wall of reduced thickness with respect to a remaining portion of said annular flange, so as to deform plastically during mechanical action of a first part of said apparatus, to adhere a deformed first side of the base wall to irregularities of a contact surface of the first part of the apparatus against the deformed first side of the base wall, thereby ensuring a hermetic seal between the deformed first side of the base wall and the first part of the apparatus, said annular seat being placed adjacent to the container body and being shaped so that said base wall thereof is situated at a level greater than internal level with respect to an end section of said flange for placement against a counter-plate of the apparatus,
   wherein the thickness of said base wall of the seal varies from ⅛ to ⅙ of a depth (h) of said seat.

2. The cartridge according to claim 1, wherein the thickness of said base wall varies from 0.1 to 0.8 mm.

3. The cartridge according to claim 1, wherein said seal compensates irregularities of a sealed coupling edge of the apparatus for production of beverages, co-operating with the seal of the cartridge.

4. The cartridge according claim 3, wherein the thickness of said base wall of the seal being from ⅛ to ⅙ of a depth (h) of said seat renders said base wall sufficiently plastically deformable under the mechanical action of said apparatus to deform to thereby cover and fill said irregularities of the contact surface of the apparatus at the first side of the base wall.

5. The cartridge according to claim 1, wherein said seal is made of PP, coextruded PP/EVOH/PP, PET, PBT, PLA, or aluminum.

6. A system for production of a beverage, comprising the cartridge according to claim 1, and a beverage extraction apparatus comprising a member that holds the container body of the cartridge and having a free edge with irregularities, co-operating with the seal of the cartridge.

7. The system according to claim 6, wherein said irregularities are troughs determining radial channels in contact with said seal.

8. A cartridge configured for containing coffee or soluble products, for insertion in an apparatus for production of beverages via pressurized water or other extraction fluid, the cartridge comprising:
   a container body, hermetically closed at opposite bases thereof, respectively for water input and for the beverage output from the cartridge;
   an annular flange at an edge of one of said bases for the beverage output; and
   an annular seat on said annular flange,
   wherein said annular seat is formed integrally with said annular flange, the annular seat is open in a direction of output of the beverage from the cartridge and delimited on the one of said bases by a base wall of smaller thickness with respect to a remaining portion of said annular flange, so as to deform plastically during mechanical action of a first part of the apparatus acting on a first side the base wall and an opposite, second side of the base wall being pressed against a second, counter-plate of said apparatus, to adhere to irregularities of a contact surface of the apparatus, ensuring a hermetic seal between the first side of the base wall and the first part of the apparatus, said annular seat being placed adjacent to the container body and being shaped that said base wall thereof is situated at a higher more internal level with respect to an end section of said flange,
   wherein the thickness of said base wall of the seal varies from ⅛ to ⅙ of a depth (h) of said seat to thereby render the seal sufficiently plastically deformable under pressure caused by the mechanical action of said first part of the apparatus acting on the base wall against the second, counter-plate of said apparatus to plastically deform to cover and fill said irregularities of the contact surface at the first side of the base wall against the first part of the apparatus.

9. The cartridge according to claim 8, wherein the thickness of said base wall varies from 0.1 to 0.8 mm.

10. The cartridge according to claim 8, wherein said annular seat compensates irregularities of a sealed coupling edge of a beverage production apparatus, co-operating with the seal of the cartridge.

11. The cartridge according to claim 8, wherein said seal is made of PP, coextruded PP/EVOH/PP, PET, PBT, PLA, or aluminum.

* * * * *